(12) United States Patent
Agrawal et al.

(10) Patent No.: US 7,600,655 B2
(45) Date of Patent: Oct. 13, 2009

(54) ANCHOR FOR ATTACHMENT OF A HANDLE TO A CONTAINER

(75) Inventors: Amit S. Agrawal, Merrimack, NH (US); David P. Piccioli, Auburn, NH (US); Stephen R. Guerin, Milford, NH (US)

(73) Assignee: Graham Packaging Company, LLP, York, PA (US)

( * ) Notice: Subject to any disclaimer, the term of this patent is extended or adjusted under 35 U.S.C. 154(b) by 521 days.

(21) Appl. No.: 11/431,462

(22) Filed: May 10, 2006

(65) Prior Publication Data

US 2007/0262047 A1    Nov. 15, 2007

(51) Int. Cl.
*B65D 25/10* (2006.01)
*B65D 53/00* (2006.01)
*B65D 81/24* (2006.01)

(52) U.S. Cl. .......... 220/759; 220/770; 215/396

(58) Field of Classification Search .......... 220/759, 220/770; 215/396, 398; 16/425
See application file for complete search history.

(56) References Cited

U.S. PATENT DOCUMENTS

| | | | |
|---|---|---|---|
| 1,667,519 A * | 4/1928 | Hechler | 220/759 |
| 3,187,859 A * | 6/1965 | Maziarka | 190/116 |
| 3,366,290 A | 1/1968 | Mojonnier et al. | |
| 4,257,525 A | 3/1981 | Thompson | |
| 4,281,770 A | 8/1981 | Rainville | |
| 4,363,415 A | 12/1982 | Rainville | |
| 4,368,827 A | 1/1983 | Thompson | |
| 4,892,207 A | 1/1990 | Cullis | |
| 4,915,241 A | 4/1990 | Morimura et al. | |
| 4,964,522 A | 10/1990 | Umetsu et al. | |
| 5,089,208 A | 2/1992 | Nakamura et al. | |
| 5,092,476 A | 3/1992 | Yasuda et al. | |
| 5,167,970 A | 12/1992 | Yoshino et al. | |
| 5,170,533 A | 12/1992 | Barry | |
| 5,297,686 A | 3/1994 | Takeuchi | |
| 5,322,184 A | 6/1994 | Bergner et al. | |
| 5,338,503 A | 8/1994 | Yanagisawa et al. | |
| 5,469,612 A | 11/1995 | Collette et al. | |
| 5,535,901 A | 7/1996 | Ishii et al. | |
| 5,560,506 A | 10/1996 | Yanagisawa et al. | |

(Continued)

FOREIGN PATENT DOCUMENTS

DE    6912814    7/1969

(Continued)

OTHER PUBLICATIONS

International Search Report and Written Opinion mailed Aug. 24, 2007 in corresponding application PCT/US2007/068545.

*Primary Examiner*—Harry A Grosso
(74) *Attorney, Agent, or Firm*—Rissman Hendricks & Oliverio, LLP (57) ABSTRACT

Disclosed herein is a container and handle assembly comprising a container having at least one anchor having a portion embedded in a body of the container. The anchor has an unembedded portion with an attachment site. The assembly further comprises a handle formed separately from the container, where the handle has a mating attachment site for engaging the attachment site of the unembedded portion of the anchor. Also disclosed are methods of forming a container having at least one anchor partially embedded therein.

13 Claims, 13 Drawing Sheets

U.S. PATENT DOCUMENTS

| | | | |
|---|---|---|---|
| 5,622,579 A | 4/1997 | Tobias | |
| 5,637,167 A | 6/1997 | Krishnakumar et al. | |
| 5,704,506 A | 1/1998 | Tobias et al. | |
| 5,769,256 A | 6/1998 | Medal | |
| 5,795,534 A | 8/1998 | Akutsu et al. | |
| 5,819,966 A | 10/1998 | Ota et al. | |
| 5,836,469 A * | 11/1998 | Zebrowski | 215/384 |
| 5,861,072 A | 1/1999 | Medal | |
| D405,690 S | 2/1999 | Takahashi et al. | |
| D405,691 S | 2/1999 | Takahashi et al. | |
| 5,918,754 A | 7/1999 | Lyons et al. | |
| 5,931,324 A | 8/1999 | Lyons et al. | |
| D414,109 S | 9/1999 | Ota et al. | |
| 5,988,418 A | 11/1999 | Maeshima | |
| 6,012,597 A | 1/2000 | Nishihara et al. | |
| D421,386 S | 3/2000 | Ota et al. | |
| D423,350 S | 4/2000 | Takahashi et al. | |
| 6,068,718 A | 5/2000 | Medal | |
| 6,068,901 A | 5/2000 | Medal | |
| D428,338 S | 7/2000 | Iisuka et al. | |
| 6,179,143 B1 | 1/2001 | Grob | |
| D438,803 S | 3/2001 | Takahashi et al. | |
| D439,521 S | 3/2001 | Takahashi et al. | |
| D439,844 S | 4/2001 | Takahashi et al. | |
| 6,444,158 B1 | 9/2002 | Grob et al. | |
| 6,460,715 B1 | 10/2002 | Yonemori et al. | |
| 6,494,333 B2 | 12/2002 | Sasaki et al. | |
| 6,601,283 B2 | 8/2003 | Wunderlich | |
| 6,855,289 B2 | 2/2005 | Krishnakumar et al. | |
| 2001/0042731 A1 | 11/2001 | Itokawa et al. | |
| 2003/0006210 A1 | 1/2003 | Iizuka et al. | |
| 2003/0019091 A1 | 1/2003 | Wunderlich | |
| 2003/0173328 A1 | 9/2003 | Herckner | |

FOREIGN PATENT DOCUMENTS

| | | |
|---|---|---|
| EP | 173196 A2 | 3/1986 |
| EP | 0460788 | 5/1997 |
| JP | 05097146 | 4/1993 |
| JP | 07132550 | 5/1993 |
| JP | 06-071733 A | 3/1994 |
| JP | 09183439 | 7/1997 |
| JP | 2000016434 | 1/2000 |
| JP | 2000218683 | 8/2000 |
| JP | 2001048146 | 2/2001 |
| JP | 2003231171 | 8/2003 |
| WO | WO97/43108 A1 | 11/1997 |
| WO | WO98/05566 | 2/1998 |
| WO | WO99/48761 | 9/1999 |

* cited by examiner

FIG. 23

ANCHOR FOR ATTACHMENT OF A HANDLE TO A CONTAINER

FIELD OF THE INVENTION

The present invention relates to plastic containers having attachable handles.

BACKGROUND OF THE INVENTION

Containers for flowable products, such as liquids and granular products, have been formed of plastic by a variety of methods. For example, plastic containers have been blow molded to form an integral container body, neck finish and handle. Other plastic containers have been formed with an integral container body and neck finish, and a separate handle later attached to the container body after removal from the blow mold. Still other plastic containers have been formed by positioning an integral handle and neck finish in a blow mold, whereby during blowing of the container body (from a separate preform placed in the blow mold) the handle and the neck finish become attached to the container body.

In some instances, it may be desirable to form the container body in a blow mold without the handle being present so that the blow mold can be simpler in design, e.g., does not require recesses or pockets to form or hold the handle. It also may be desirable to use a different plastic material for the handle (than for the container body) for reasons such as strength, color, aesthetics or cost. It may further be desirable to provide a separate handle that is attachable post-mold to the formed container.

SUMMARY OF THE INVENTION

In accordance with one embodiment of the invention, a container and handle assembly is provided comprising a container and a handle formed separately from the container. The container is formed with an anchor portion to allow post-mold attachment of a handle to the anchor. The container, anchor and handle may be made of any plastic material, and they may be made of different plastic materials. For example, the container body, as well as other portions of the container (e.g., the neck finish), may be made of a polyester, such as polyethylene terephthalate, while the anchor and/or handle is made of a polyolefin, such as polypropylene.

Another embodiment provides a container and handle assembly, the container having at least one anchor having a portion embedded in a body of the container. The at least one anchor is separately formed from the container. The anchor further has an unembedded portion with an attachment site. The assembly also comprises a handle having a mating attachment site for engaging the attachment site of the unembedded portion of the anchor.

Another embodiment provides a plastic container having at least one separately formed plastic anchor partially embedded in a body of the container. The at least one anchor is separately formed from the container and has an unembedded portion with an attachment site that mates with a corresponding attachment site in a separately formed handle.

Another embodiment provides a method of forming a plastic container, comprising:

positioning at least one plastic anchor in a blow molding cavity; and blow molding to form a container that partially embeds the at least one plastic anchor, wherein an unembedded portion of the at least one anchor has an attachment site that mates with a corresponding attachment site in a separately formed handle.

BRIEF DESCRIPTION OF THE DRAWINGS

Various embodiments of the invention will be understood from the following description, the appended claims and the accompanying drawings, in which:

DETAILED DESCRIPTION

Figure 1:
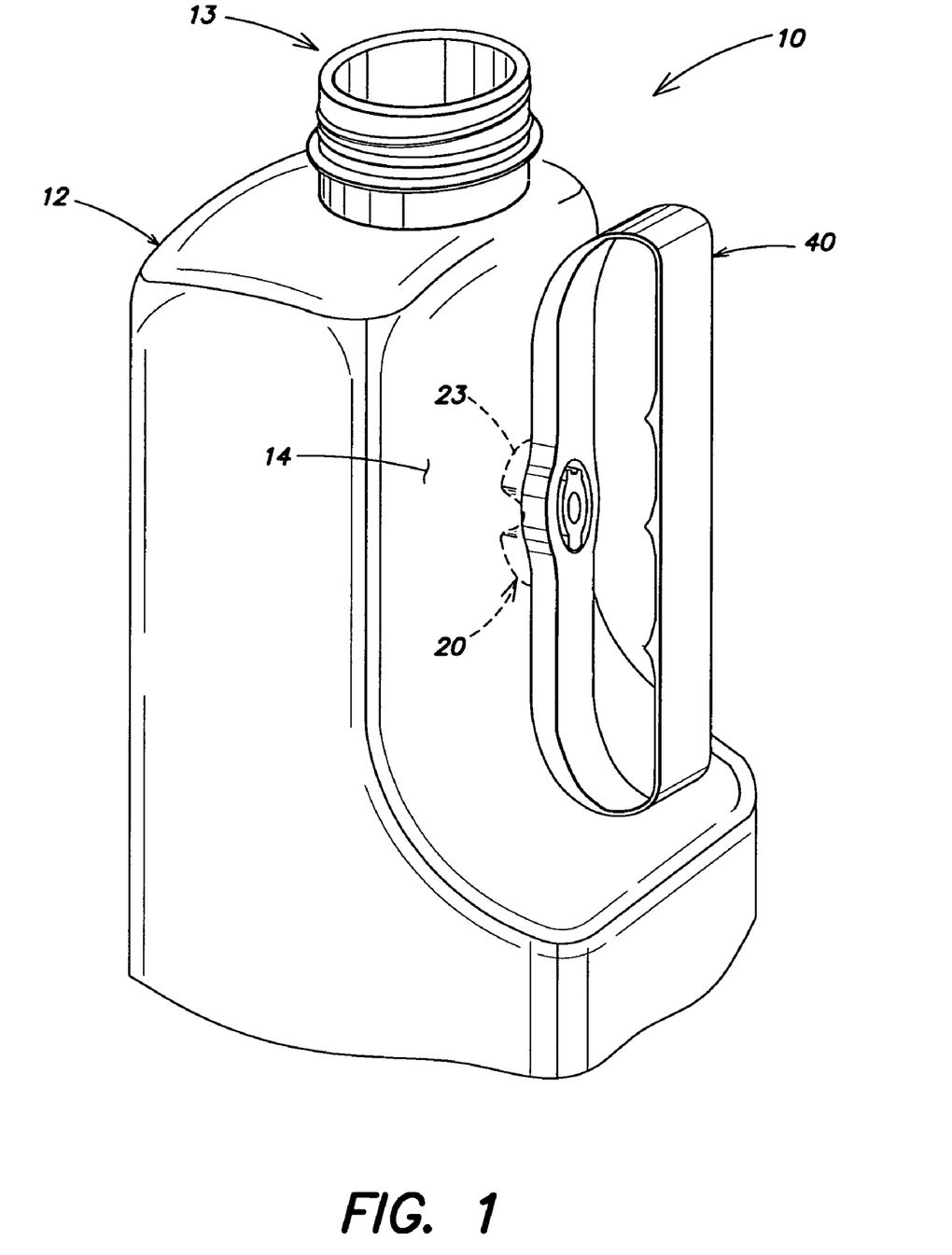
FIG. 1 is a perspective view of an embodiment of a container and handle assembly, showing the handle secured to the container via an anchor embedded in the container.

Referring in more detail to the drawings, FIG. 1 shows a perspective view of an embodiment of a container and handle assembly 10. Assembly 10 comprises container 12 having a neck 13 and a body 14, and a handle 40 that is formed separately from (e.g., post blow mold) yet attachable to container 12. FIG. 1 depicts a substantially flat sidewall, although container 12 and body 14 may be of any shape used for plastic bottles. Anchor 20 is partially embedded in body 14 (embedded portion indicated by dotted lines) and provides an attachment site for securing handle 40 to container 12.

The container 12 may comprise any plastic material, e.g., a polyethylene terephthalate (PET) beverage bottle or the like, to define an interior volume in which a product is to be received. The container 12 can be blow molded, injection molded, or the like. Handle 40 is formed separately from the container 12, and can be prepared by injection molding or the like. Handle 40 may be formed of a different plastic material and/or color than the container 12, thereby increasing the choice of materials available and potentially reducing the material cost of the overall container and handle assembly. For example, the handle 40 may be formed of any suitable packaging material such as polypropylene or the like. Providing the handle 40 separately from and after the container 12 is formed can simplify the design of the container 12 and of the mold used to make it.

Figure 2:
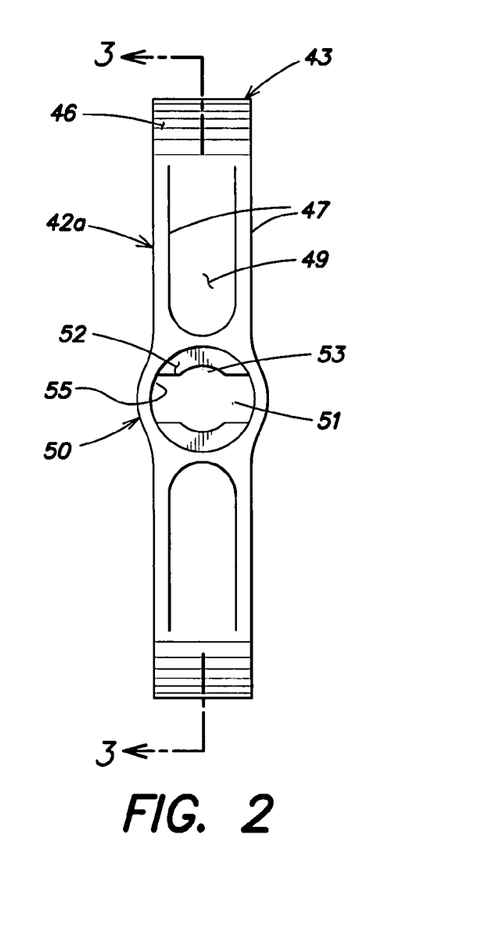
FIG. 2 is a plan view of the handle separate from the container of FIG. 1, showing a slot in the handle for attachment to the anchor.
Figure 3:
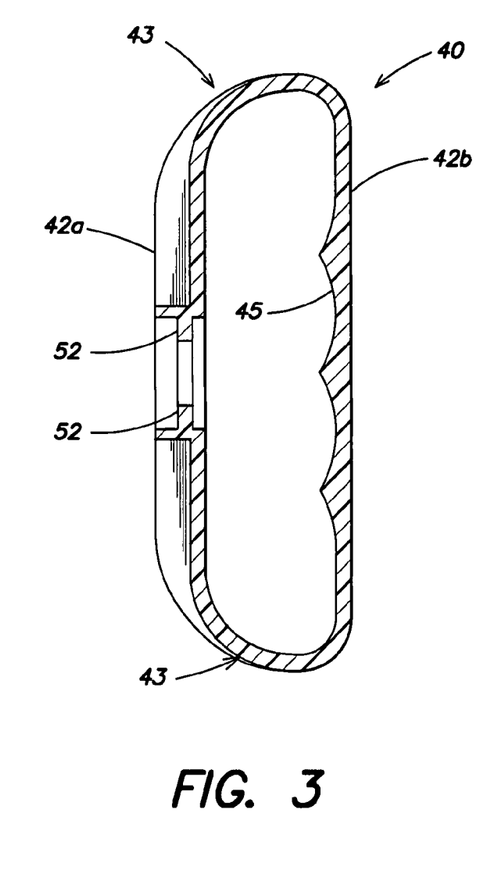
FIG. 3 is a sectional side view of the handle taken along lines 3-3 of FIG. 2.
Figure 4:
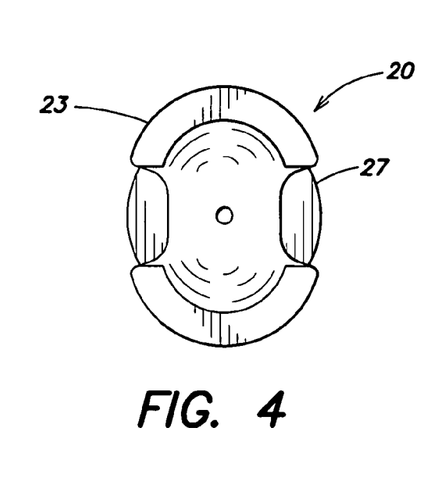
FIG. 4 is a plan view of an embedded anchor portion, as viewed from the interior of the container (not shown)

Container 12 is constructed to be secured to handle 40 by engaging respective attachment sites. FIGS. 2 and 3 depict one embodiment of a handle 40 separate from the container of FIG. 1, where handle 40 can have the shape of a collar, such as a flattened elliptical collar comprising two opposing substantially planar bands 42a and 42b joined by curved bands 43. Band 42a contains an attachment site 50 that mates with a corresponding attachment site on anchor 20, whereas the other band 42b can be a gripping portion for a user to grasp the handle. An inner wall 45 of band 42b may include ergonomic features such as ribbed finger recesses that match the contours of a user's fingers to enhance the gripping (FIG. 3).

FIG. 2 shows a plan view of band 42a containing attachment site 50. Attachment site 50 has a disk-like opening with an inner diameter 55. Two opposing arcuate strips 52 are situated on inner diameter 55, where each strip features opposing concave recesses 53. The strips 52 define the shape of slot 51 as a rectangular opening with a circular bulge at the midpoint provided by recesses 53.

To impart a sufficient thickness to attachment site 50 for accommodating arcuate strips 55, the thickness of edges 47 of band 42a can taper from a maximum at site 50 to a minimum at curved band 43 (thinnest portion). This design can minimize the amount of material used to make handle 40 without requiring the entire handle 40 to have the same thickness. Like curved band 43, the center of band 42b can maintain the same minimum thickness except for the step in thickness to site 50, resulting in depression 49 defined by edges 47 and site 50. However, it can be appreciated that the entire handle can be formed with the same thickness.

FIGS. 4-7 show two plan and two side views of anchor 20 prior to embedding in a container. Embedding involves blow molding a preform or parison formed by injection or extrusion molding) around the anchor such that the container body envelops a portion of the anchor, preferably with minimal loss to the integrity of the container body. Thus, the anchor is formed prior to container formation, and the anchor is embedded in the container body during the blow molding process. This is distinguished from certain prior art containers use integrally formed portions to provide attachment sites for handles, e.g., hooks. However, such a design can add further complexity to the mold cavity and molding process. Other prior art handles can be fused or welded to a container with the aid of energy directing protrusions integrally connected to the handle, to allow the container to deform around the protrusion. However, this handle can only be connected using special machinery available to only a few users. In contrast, the present invention provides a stand-alone container having an anchor attachable to a separately formed handle, which can be attached by a wide variety of users.

Figure 5:
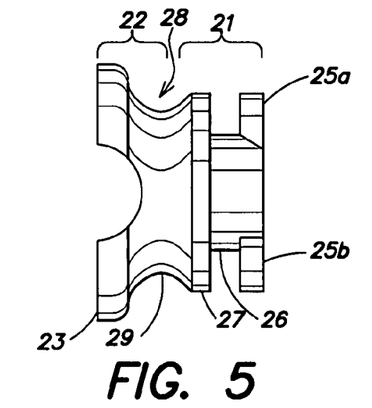
FIG. 5 is a side view of the anchor.
Figure 6:
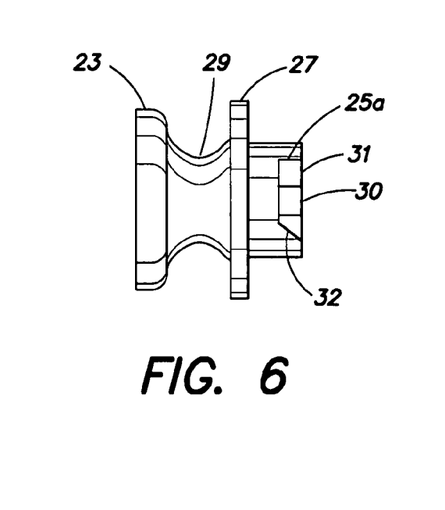
FIG. 6 is a side view of the anchor.
Figure 7:
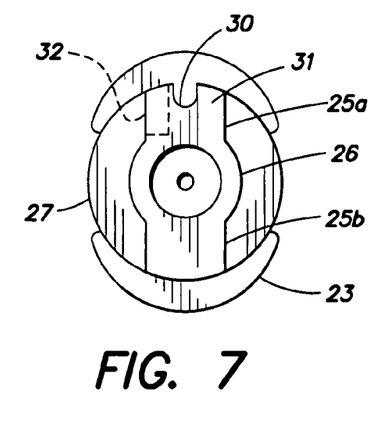
FIG. 7 is a plan view of the unembedded anchor portion.

FIG. 5 depicts a side view of anchor 20 having an embedded portion 22 (after being embedded in the body), and unembedded portion 21. Boundary 28 lies between the embedded (22) and unembedded (21) portions and is defined by engagement recesses 29. Recesses 29 provide boundary 28 with a smaller diameter, which, during the blow molding process, allows body 14 to form a pocket around embedded portion 22 and effectively "clasp" anchor 20 in place, leaving portion 21 unembedded. By this arrangement, removing anchor 20 would be difficult and can only be achieved by damaging the body.

Unembedded portion 21 comprises circular base 27 immediately adjacent boundary 28. Cylindrical post 26 is coaxially situated on base 27 and supports tabs 25a and 25b at its end. Tabs 25a and 25b are substantially flat and lie parallel to base 27. Tabs 25a and 25b form the mating attachment site that engages with the attachment site 50 of handle 40. From the plan view of unembedded portion 21 of FIG. 7, it can be seen that tabs 25a and 25b have a generally arcuate shape at their ends (distal from post 26). The arc of one of the tabs (shown here as tab 25a) can be interrupted by a notch 30, resulting in tab 25a terminated by two projections 31 and 32 sandwiching notch 30. Notch 30 can help lock tab 25a in place to further secure handle 40 to anchor 20, as described in more detail below.

Figure 8:
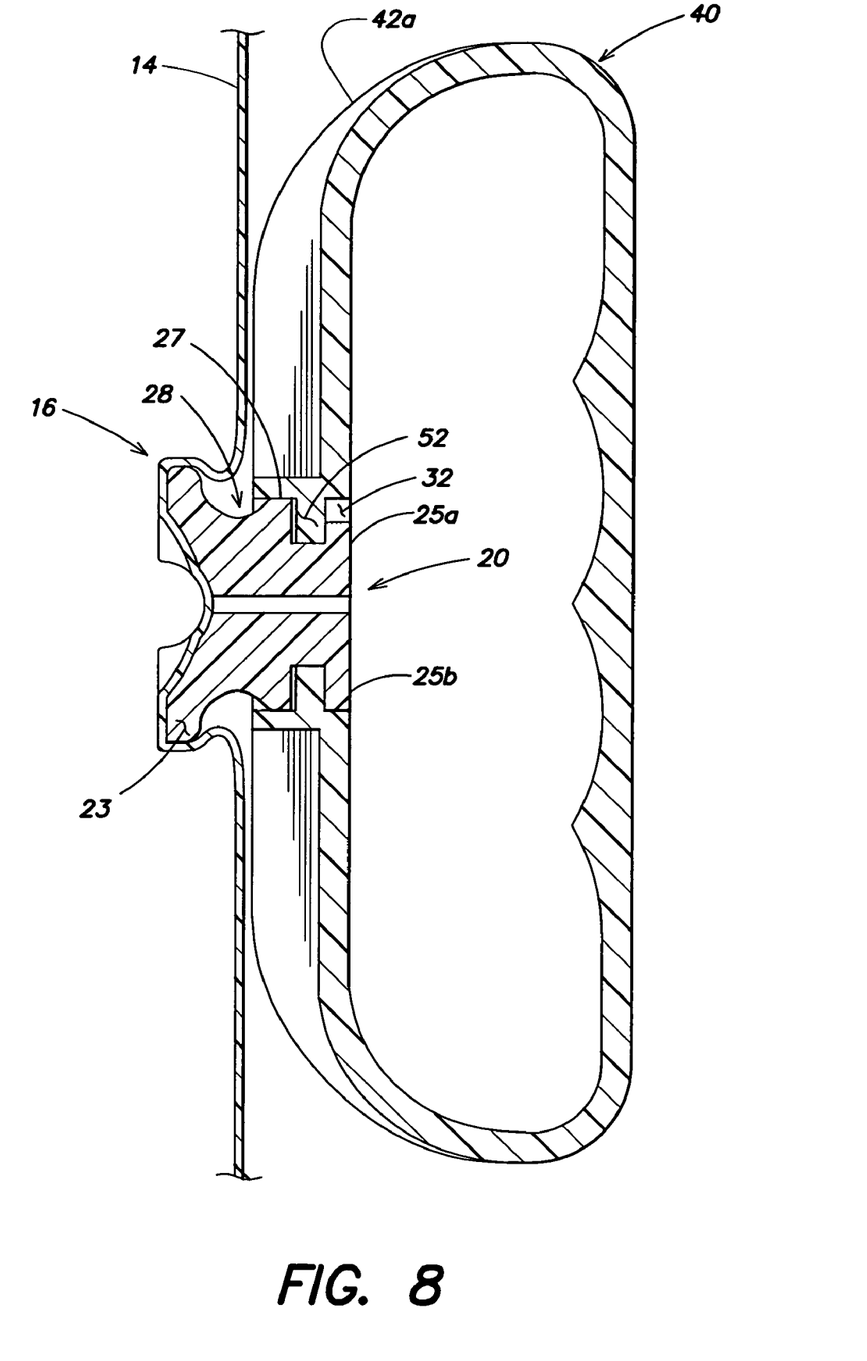
FIG. 8 is a sectional side view of the handle attached to the anchor embedded in the bottle sidewall.
Figure 9:
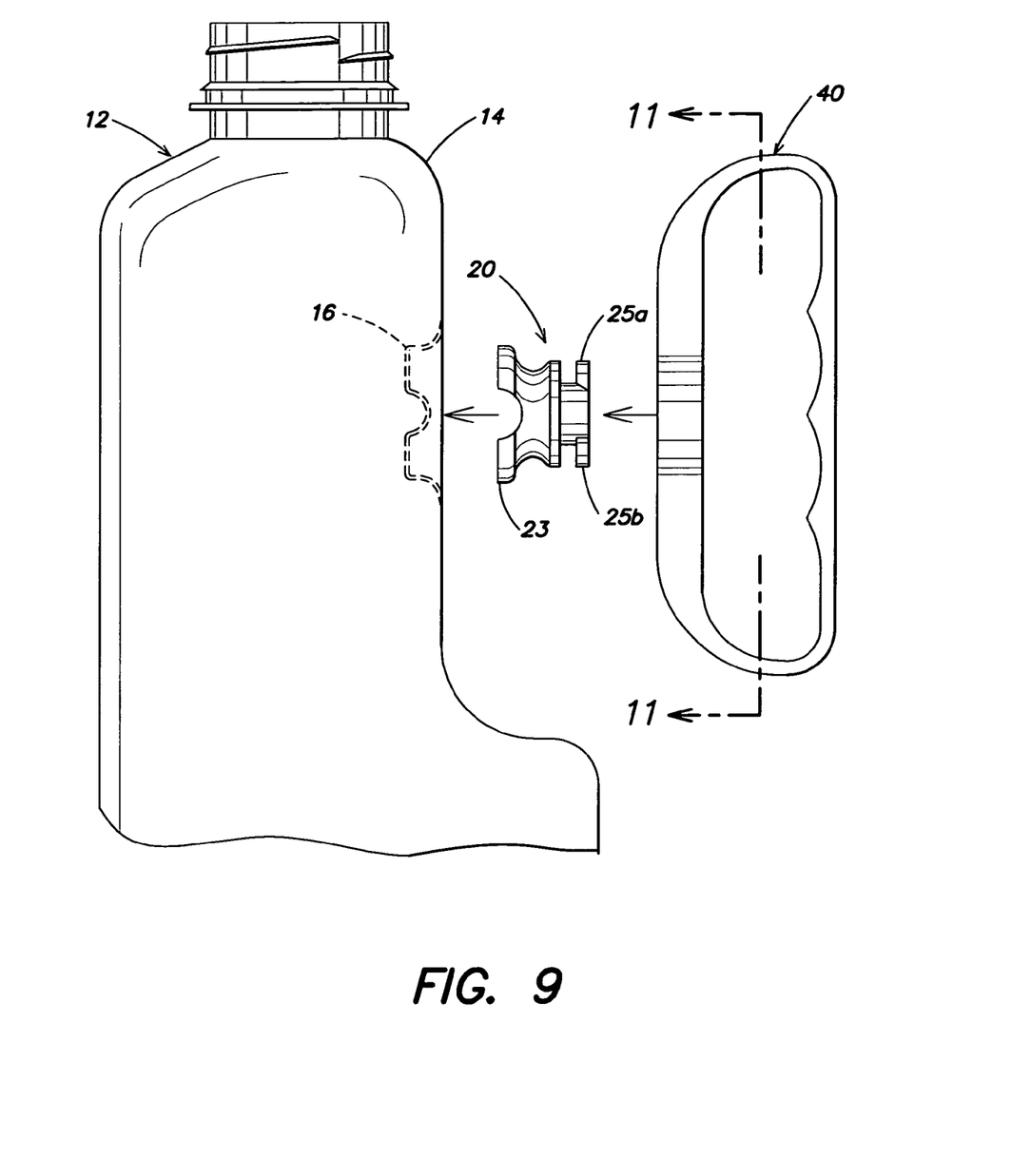
FIG. 9 is a side view of the spaced apart components—container, anchor, and handle, showing the relative positioning.

FIG. 8 is a detailed cross-sectional side view of the handle 40 secured to anchor 20, which is partially embedded in body 14. FIG. 9 provides an schematic view of spaced apart components—body 14, anchor 20, and handle 40. To accommodate anchor 20, body 14 forms a pocket 16 that conforms to the shape of the embedded portion 22 (e.g., feet 23) of anchor 20. In actual use, pocket 16 is not spaced apart from anchor 20 as shown in FIG. 9. Rather pocket 16 is formed during the blow molding process where body 14 is formed around feet 23 of anchor 20. This process can be carried out by placing anchor 20 in the blow mold cavity and radially expanding a preform, resulting in container 12 entrapping the anchors within the body.

Figure 10:
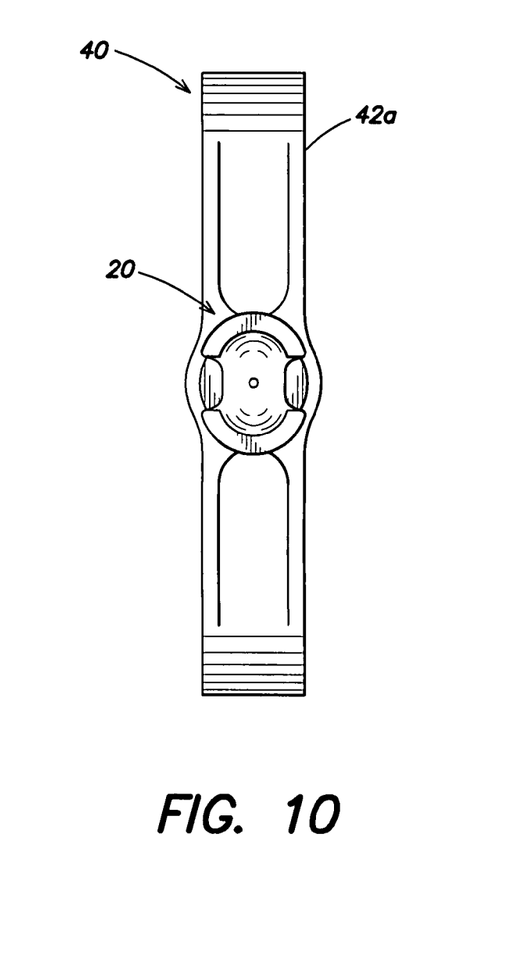
FIG. 10 is a plan view of an inner wall of the handle after attachment to the anchor (container not shown)
Figure 11:
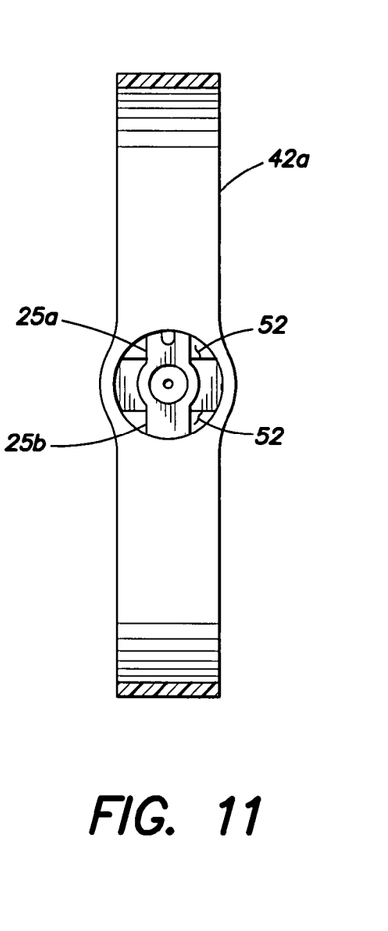
FIG. 11 is a plan view of band 42a of the handle secured to the anchor, as viewed from the outside of the container (not shown)
Figure 12:
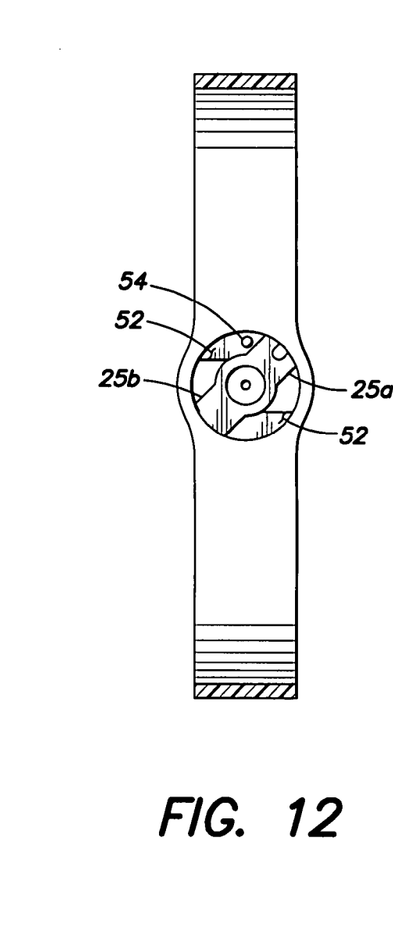
FIG. 12 is a plan view of band 42a of the handle, showing a dowel for securing and locking the handle to the anchor, as viewed from the outside of the container (not shown)

Handle 40 is secured to anchor 20 by placing slot 51 (FIG. 2) over unembedded tabs 25a and 25b. Concave recesses 53 of handle 40 accommodate the shape of cylindrical post 26 of anchor 20 (FIG. 5) and helps ensure that post 26 is coaxial with the hollow disk of handle attachment site 50. The handle is then turned 90 degrees to slide arcuate strips 52 under tabs 25a and 25b (FIGS. 8 and 11). To lock tabs 25a and 25b in the secured position, a dowel 54 can be provided on one of strips 53 of handle 40 (FIG. 12). In this design, projection 32 of tab 25a can be tapered, allowing the taper to ride over dowel 54 and snapping dowel 54 of the anchor within notch 30 of the handle. FIG. 10 is a plan view of the assembled anchor/handle portions as viewed from the inside of the container (not container), showing the embedded anchor portion 20.

The embodiment described above features a snap-fit attachment mechanism between the anchor and handle. The attachment site of the anchor (embedded in the container) provides a tab that can engage with a slot of the handle. It can be appreciated that other designs are possible, e.g., where the anchor provides a slot to receive a tab from the handle. Alternatively, other snap-fit mechanisms can be designed, or other nonsnap-fit mating features incorporated into the assembly, e.g., a tongue and groove fitting.

Figure 13:
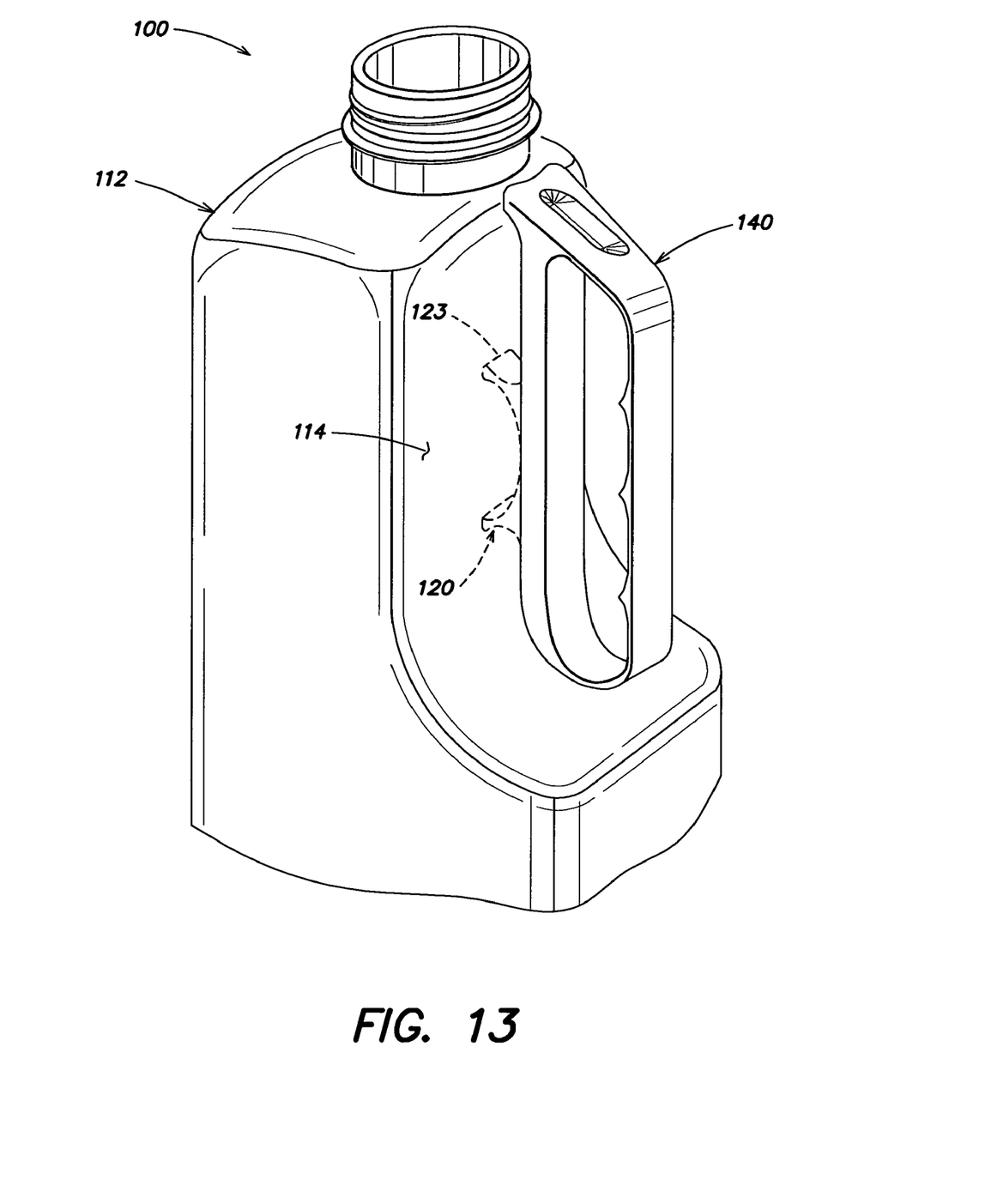
FIG. 13 is a perspective view of another embodiment of a container and handle assembly, showing the handle secured to the container via an anchor embedded in the container.

For example, FIG. 13 provides another embodiment of a container and handle assembly 100 formed by using anchor 120, embedded in body 114 of container 112, to secure handle 140. Here, anchor 120 features two anchoring points 123.

Anchoring points 123 can be spaced a desired distance and can allow the use of longer handles. Moreover, anchor 120 incorporates a track or groove, which can receive a corresponding tab.

Figure 14:
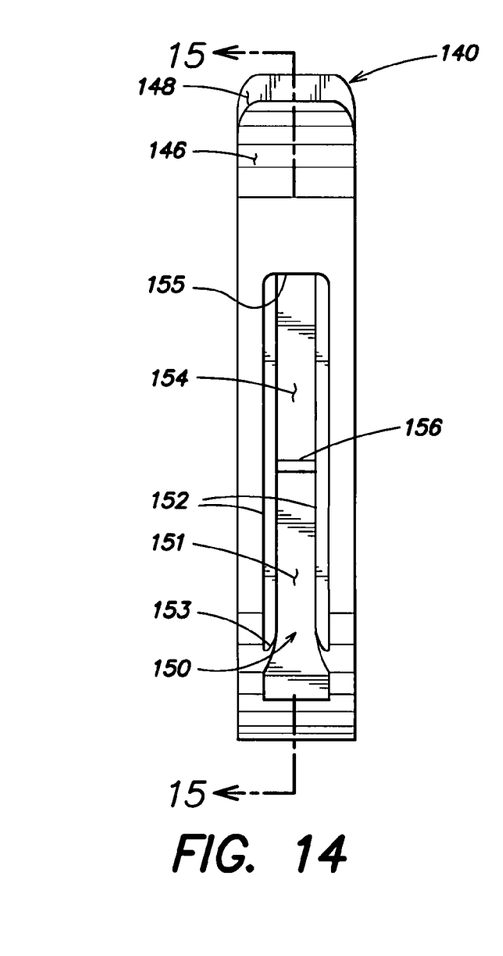
FIG. 14 is a plan view of the handle having a channel as an attachment site.
Figure 15:
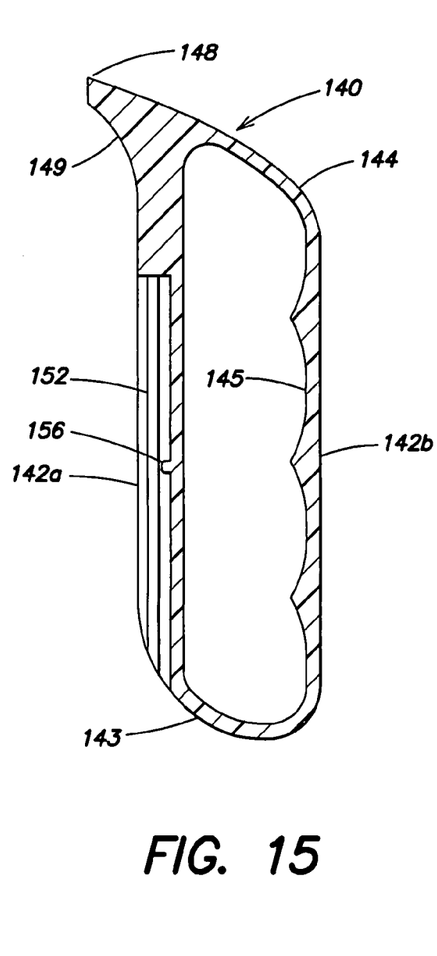
FIG. 15 is a sectional side view of the handle taken along lines 15-15 of FIG. 14.

FIGS. 14 and 15 show plan and sectional side views of handle 140. Again, handle 140 can take the form of a collar comprising two opposing substantially planar bands 142a and 142b joined by a lower curved portion 143, where band 142a contains the mating attachment to anchor 120. In contrast to the previous embodiment, the tops of bands 142a and 142b are joined by an inclined band 144. Moreover, band 142a curves outward (relative to the inner walls of handle 140) until terminated at point 148. As a result, the outer wall of band 142a has a profile that can conform to the shape of the container. It will be appreciated that the containers can be of any shape and consequently band 142a of handle 140 can also take the shape that conforms with the bottle. As with the previous embodiment, the inner wall 145 of band 142b can have ribbed finger recesses for grasping.

Set into the outer face of band 142a is a channel 150 spanning a portion of the length of band 142a. Channel 150 is formed from two opposing inner walls joined by a floor 154 and a back wall 155. Each inner wall contains a ledge 152 that is set off a height from floor 154, where each ledge 152 runs the length of the inner wall, i.e. from the back wall 155 of channel 150 to tapered end 153. The ledges 152 are designed to slidably receive a groove provided by the anchor 120, e.g., as a tongue and groove type fitting. Floor 154 can optionally contain rib 156 to engage a notch in the anchor to lock the anchor in place (e.g., notch 127 of FIG. 18).

Figure 16:
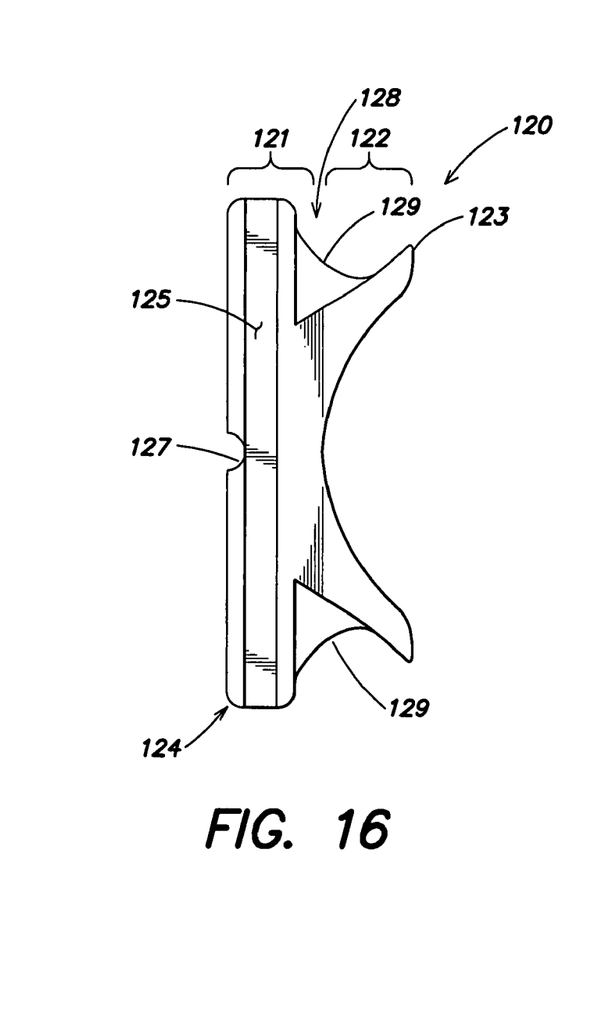
FIG. 16 is a side view of the anchor having two anchoring points.
Figure 17:
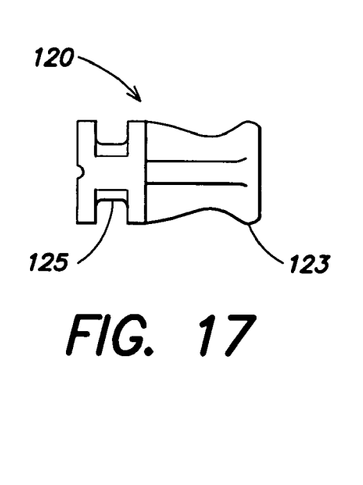
FIG. 17 is a side view of the anchor of FIG. 16.
Figure 18:
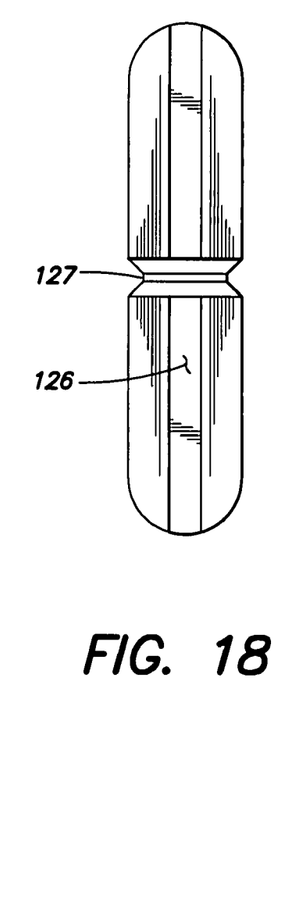
FIG. 18 is a plan view of the unembedded portion of anchor of FIG. 16.
Figure 19:
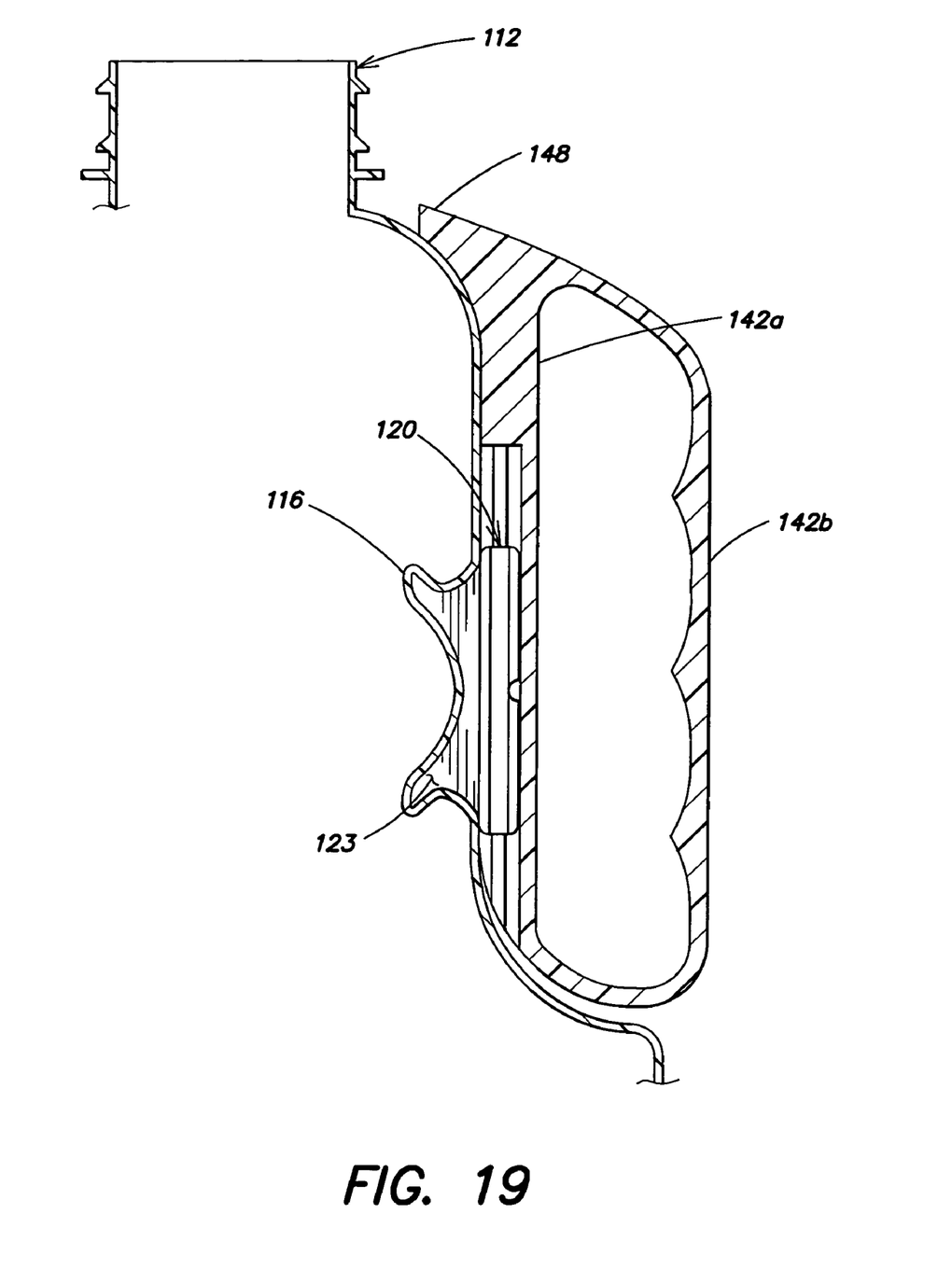
FIG. 19 is a detailed sectional side view of the handle secured to the container.

FIGS. 16-18 provide two side and plan views of anchor 120. Anchor 120 features unembedded and embedded portions 121 and 122, respectively, and are "separated" by boundary 128, as defined by engagement recesses 129. Engagement recesses 129 allow the container 112 to envelop and retain embedded portion 122. Embedded portion 122 comprises two outwardly extending anchor points 123, which will reside in a conforming pocket 116 (see FIG. 19) in container 112. The anchor points 123 converge when proceeding from their ends toward boundary 128. Extending from boundary 128 toward the unembedded portion 121 is a supporting beam 124. The top of beam 124 (FIG. 18) features an optional mid-point depression 126 running the length of beam 124, and an optional mid-point notch 127 the width of beam 124 (and perpendicular depression 126). Depression 126 can function as a venting pathway to prevent the formation of air pockets that may hamper the integrity of the container and/or the engagement of anchor 120 by the container. Notch 127 can be used as an additional securement point for anchor 120 by engaging ridge 156 of handle 140 (FIGS. 14 and 15).

Figure 20:
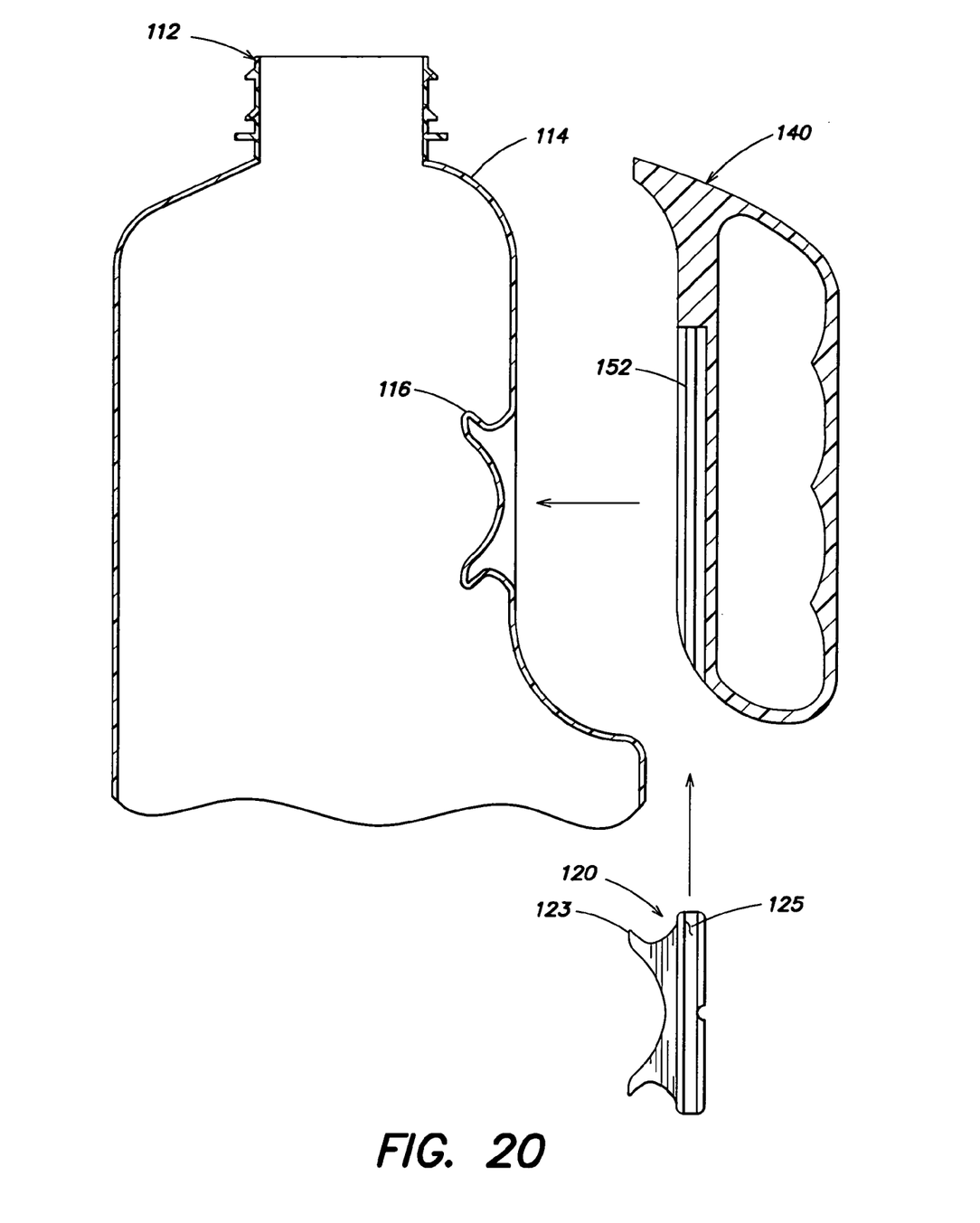
FIG. 20 is a side view of the spaced apart components—container, anchor, and handle.
Figure 21:
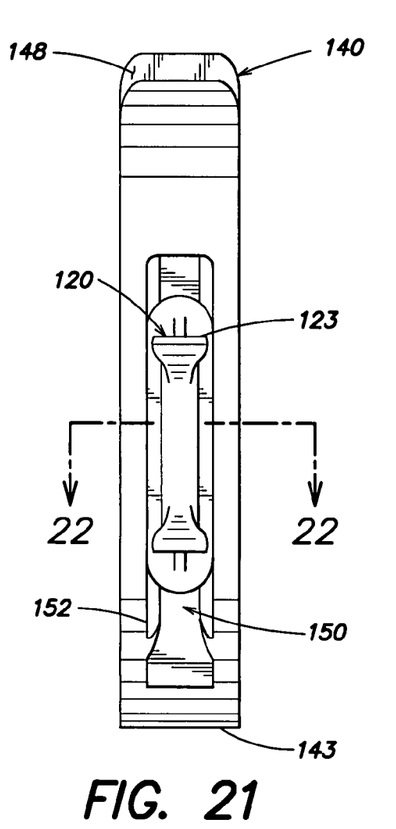
FIG. 21 is a plan view of the handle engaging the anchor, as viewed from the inside of the container (not shown)
Figure 22:
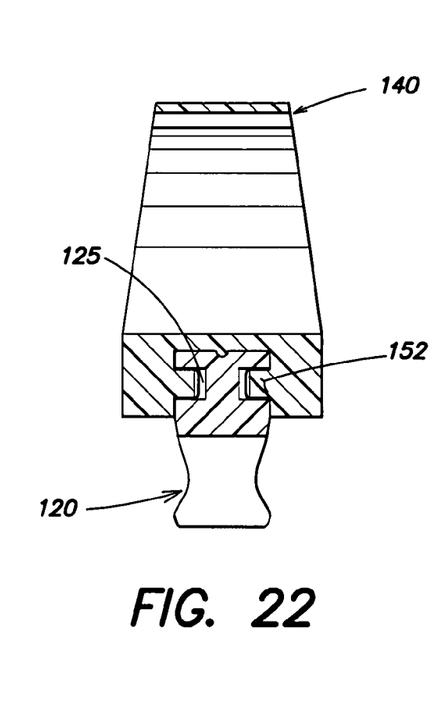
FIG. 22 is a sectional view the handle secured to the anchor taken along lines 22-22 of FIG. 21.

Beam 124 has grooved edges 125 having a height sufficient to slidably receive ledges 152 from handle 140, as illustrated in FIGS. 19-22. FIG. 20 schematically shows body pocket 116, which results from blow molding body 114 around anchor points 123. In this orientation, grooved edges 125 run substantially parallel to the sidewall of the container. Sliding handle 140 through grooved edges 125 secures the handle to the container.

Figure 23:
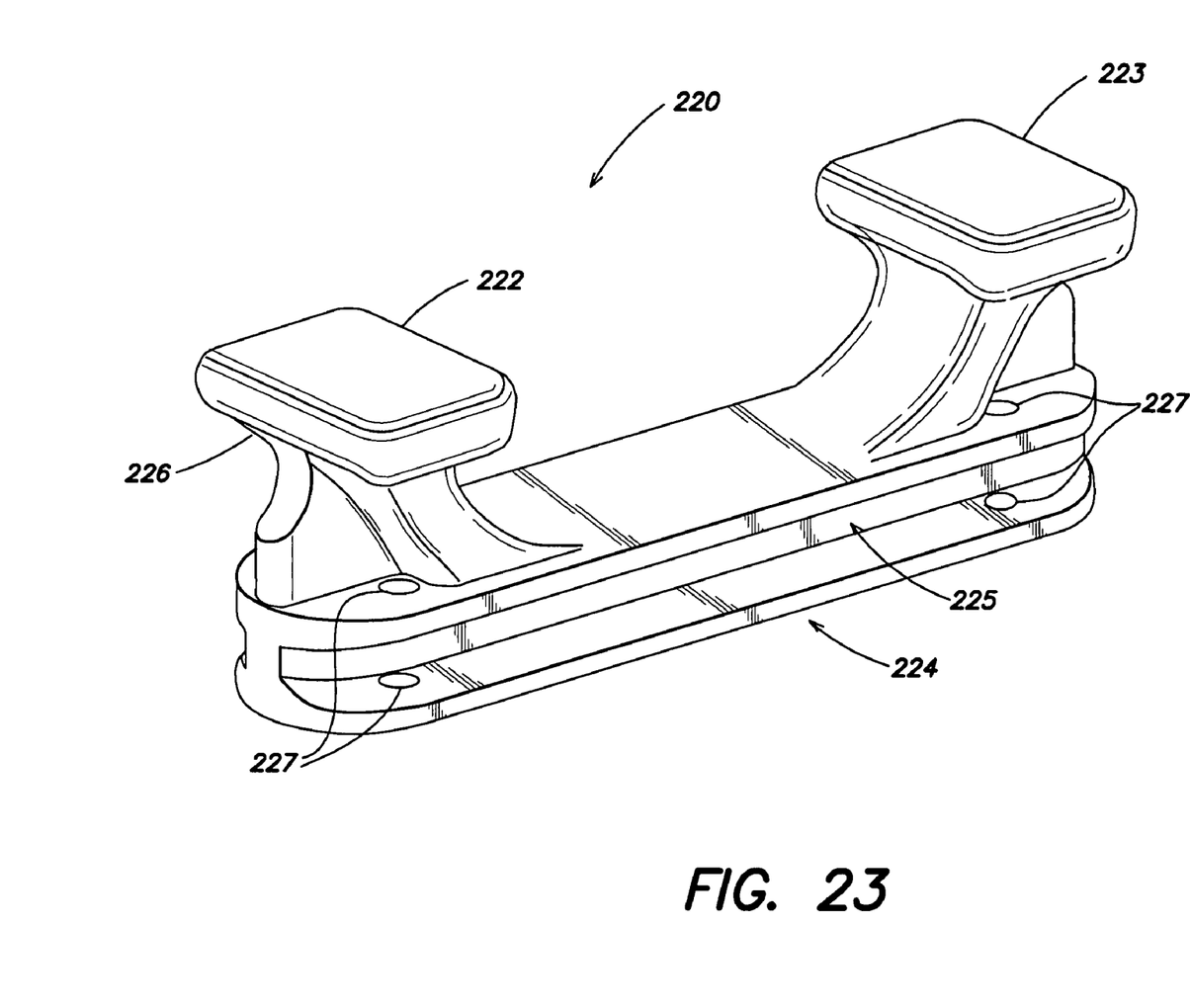
FIG. 23 is a perspective view of another embodiment of an anchor.

FIG. 23 provides another embodiment of an anchor having additional features. Anchor 220 (which can also engage handle 140) has two anchoring ends 223, each end 223 providing an extended base end 222 to cover a wider area than points 123 of previously described anchor 120. Extended base ends 222 can take the form of a circle, square (FIG. 23), rectangle, oval, or other oblong shape. Extended base ends 222 provide an additional area for a container to deform around and can enhance the bonding of the anchor to the container. FIG. 23 also shows a beam 224 that supports the anchor ends 223 and contains a groove 225 for fitting ledges supplied by an attachable handle. The groove 225 can be provided with vent holes 227 to prevent the formation of air pockets in the container body. The top of beam 224 (not shown) can optionally contain a notch to engage a corresponding rib of the handle. Recesses 226 lie between anchoring ends 223 and beam 224 to allow a container to embed anchor 220 in a corresponding pocket.

The embodiments described herein depict the anchor embedded in the sidewall of the container body. Other embodiments can provide the anchor embedded in the container base for products that are desirably stored upside down, e.g., shampoo bottles, intravenous fluid housings, etc. Thus, "handle" can encompass hooks, catches, or other design for handling the bottle. In other embodiments, more than one anchor can be used and embedded in different sites, e.g., different sidewalls, a sidewall and a base, etc.

Another embodiment provides a method of making a container having partially embedded anchor(s). The anchor(s) are partially embedded by blow molding a portion of the container body around the anchor ends or feet. The blow molding can be performed by any method known in the art, e.g., extrusion blow molding, stretch blow molding, etc. In one embodiment, the blow molding comprises placing the anchor(s) along with a preform in a blow molding cavity, and axially stretching the preform such that the container body partially entraps the anchor(s). This process can be performed in an analogous manner to that described in U.S. Pat. No. 6,855,289, which describes blow molding a container about a retaining member of a handle, the disclosure of which is incorporated herein by reference.

There has thus been described embodiments of a container and handle assembly that provides various benefits. Forming a combined handle separate from the container enables the container to be of a simpler design and permits the use of a standard blow molder. The handle may be secured onto the container with conventional packaging assembly equipment. The material used for the container body can be different from the material used for the handle, anchor, and/or finish. Desirably, a less expensive material can be chosen for each part to provide a more economical manufacture while still achieving the desired functions. The handle, anchor, and/or container may also be formed of different colors and by different methods than the container body, as desired for a wide range of applications.

A number of modifications and variations will readily suggest themselves to persons of ordinary skill in the art in view of the foregoing description. Directional words such as top, bottom, upper, lower, radial, circumferential, lateral, longitudinal and the like are employed by way of description and not limitation. The invention is intended to embrace all modifications and variations that fall within the scope of the appended claims.

The invention claimed is:

1. A container and handle assembly comprising:
   a container having a blow molded plastic container body;
   a plastic anchor separately formed from the container and having at least one portion embedded in the container body by blow-molding the container body around the embedded anchor portion and having an unembedded portion with an attachment site; and
   a handle having a mating attachment site for engaging the attachment site of the unembedded portion of the anchor;

the anchor comprising two embedded portions and a supporting beam extending between the two embedded portions, the anchor attachment site being disposed along a length of the supporting beam; and the handle being in the shape of a collar having opposing inner and outer bands joined at each end, the outer band comprising a gripping portion spaced apart from the container body, and the inner band being disposed along the beam and including the mating attachment site disposed along a length of the beam to support the handle on the container.

2. The assembly of claim 1, wherein the anchor attachment site comprises a slot and the mating attachment site of the handle comprises a tab receivable by the slot.

3. The assembly of claim 2, wherein the slot comprises a groove and the tab comprises a ledge, the groove capable of slidably engaging the ledge.

4. The assembly of claim 3, wherein the groove comprises at least one stop to lock the ledge within the groove.

5. The assembly of claim 1, wherein the container is made of one plastic material, and the handle is made of a different plastic material.

6. The assembly of claim 5, wherein the plastic material of the container body is polyethylene terephthalate and the plastic material of the handle is polypropylene.

7. The assembly of claim 5, wherein the container comprises a polyethylene terephthalate beverage container.

8. The assembly of claim 7, wherein the container comprises an integral blow-molded and substantially transparent PET beverage container.

9. The assembly of claim 1, wherein the attachment site and mating attachment site comprise a tongue and groove type fitting.

10. The assembly of claim 9, wherein the attachment site comprises a pair of elongated grooves disposed along opposite side walls of the supporting beam.

11. The assembly of claim 10, wherein the mating attachment site comprises a pair of elongated ledges which slidably fit within the grooves.

12. The assembly of claim 1, further comprising:
means for locking the anchor to the handle.

13. The assembly of claim 1, wherein the two embedded portions have extended base ends providing an additional area for the container to deform around and secure the anchor to the container body.

* * * * *